United States Patent
Sensui et al.

[11] Patent Number: 5,497,229
[45] Date of Patent: Mar. 5, 1996

[54] PHOTOMETERING APPARATUS HAVING A SPLIT LIGHT RECEIVING DEVICE

[75] Inventors: Takayuki Sensui; Chikara Yamamoto, both of Tokyo, Japan

[73] Assignee: Asahi Kogaku Kogyo Kabushiki Kaisha, Tokyo, Japan

[21] Appl. No.: 250,626

[22] Filed: May 27, 1994

[30] Foreign Application Priority Data

May 28, 1993 [JP] Japan .................................. 5-127152

[51] Int. Cl.⁶ .................................................. G01J 1/42
[52] U.S. Cl. ........................................ 356/218; 356/225
[58] Field of Search ............................... 356/213, 218,
356/221, 222, 225, 227, 233; 250/237 R;
359/738, 739, 740, 728; 354/429, 432,
433, 434, 414, 422, 423

[56] References Cited

U.S. PATENT DOCUMENTS

| | | | |
|---|---|---|---|
| 1,990,361 | 2/1935 | Bailey, Jr. | 356/225 |
| 3,134,021 | 5/1964 | Ploke | 356/225 |
| 3,272,104 | 9/1966 | Lytton | 356/222 |
| 3,478,663 | 11/1969 | Tsuruoka et al. | 356/225 |
| 3,902,792 | 9/1975 | Plummer | 354/296 |
| 4,005,444 | 1/1977 | Uchiyama et al. | 354/27 |
| 4,437,746 | 3/1984 | Ikemori | 354/479 |
| 4,542,961 | 9/1985 | Sato | 359/739 |
| 4,676,607 | 6/1987 | Wakamiya | 359/739 |
| 5,021,818 | 6/1991 | Satoh et al. | 354/429 |
| 5,114,225 | 5/1992 | Ogawa | 354/481 |
| 5,289,225 | 2/1994 | Hirai | 354/402 |

FOREIGN PATENT DOCUMENTS

| | | | |
|---|---|---|---|
| 0027027 | 2/1983 | Japan | 356/218 |
| 0288734 | 11/1989 | Japan | 356/218 |
| 5087631 | 4/1993 | Japan | 356/218 |

*Primary Examiner*—Hoa Q. Pham
*Attorney, Agent, or Firm*—Greenblum & Bernstein

[57] ABSTRACT

A photometering apparatus for measuring the brightness of an object to be photographed, includes a condenser lens having at least one aspheric lens surface for condensing a bundle of rays reflected from the object. A diaphragm is provided at a predetermined distance behind the condenser lens with respect to the object, and a split type light receiving device is provided behind the diaphragm to receive light which passes through the diaphragm. These elements satisfy the condition represented by the formula $0.3 \leq L_{ASP}/T_L \leq 0.7$, wherein "T" represents the distance between the surface of the condenser lens nearer to the object to be photographed and the light receiving device, and wherein "$L_{ASP}$" represents the reduced distance between the aspheric surface of the condenser lens and the diaphragm. The term "$L_{ASP}$" is defined by the relationship $L_{ASP}=(d_L/N)+d_s$, wherein "$d_L$" represents the thickness of the lens, "$d_s$" the distance between the diaphragm and the surface of the lens nearer to the image, and "N" the refractive index of the lens at the e-line.

12 Claims, 5 Drawing Sheets

PHOTOMETERING APPARATUS HAVING A SPLIT LIGHT RECEIVING DEVICE

BACKGROUND OF THE INVENTION

1. Field of the Invention

The present invention relates to a photometering apparatus for measuring the brightness of an object to be photographed. More precisely, it relates to a photometer in which a split type light receiving device is used to individually detect the brightness of divided portions of the object in separate areas of a picture plane.

2. Description of Related Art

A conventional split measurement type of photometering apparatus for measuring the brightness of an object to be photographed usually comprises the combination of a condenser lens (i.e., gathering lens) for condensing a bundle of rays reflected from the object, and a split type light receiving device. A diaphragm is usually integrally formed with the condenser lens.

If the condenser lens is made of a single lens, field curvature (i.e., curvature of image) cannot be completely corrected, even by the use of an aspheric surface. Consequently, the spot diameter on the light receiving surface increases as the distance of the beam spot from the optical axis increases.

Accordingly, in a known photometer in which the condenser lens is made of a single lens, it is possible to detect the brightness of a beam spot at the center of the picture plane, but it is impossible to correctly measure the brightness of the beam spot in the peripheral edge portion of the picture plane in which the spot diameter is larger than the width of the split separate areas of the light receiving device.

SUMMARY OF THE INVENTION

The primary object of the present invention is to provide a photometering apparatus for measuring the brightness of an object to be photographed, which is capable of correctly measuring the brightness of the beam spot in the peripheral edge portion of the picture plane using a single lens as the condenser lens.

According to the present invention, there is provided a photometering apparatus for measuring the brightness of an object to be photographed, including a condenser lens having at least one aspheric lens surface for condensing a bundle of rays reflected from the object. A diaphragm is provided at a predetermined distance behind the condenser lens with respect to the object, and a split type light receiving device is provided behind the diaphragm to receive light which passes through the diaphragm. These elements satisfy the condition represented by the following formula (1):

$$0.3 \leq L_{ASP}/T_L \leq 0.7 \tag{1}$$

wherein "$T_L$" represents the distance between the surface of the condenser lens nearer to the object to be photographed and the light receiving device, and wherein "$L_{ASP}$" represents the reduced distance between the aspheric surface of the condenser lens and the diaphragm. The term "$L_{ASP}$" is defined by the relationship $L_{ASP}=(d_L/N)+d_s$, wherein "$d_L$" represents the thickness of the lens, "$d_s$" the distance between the diaphragm and the surface of the lens nearer to the image, and "N" the refractive index of the lens at the e-line.

According to another aspect of the present invention, there is provided a photometering apparatus for measuring the brightness of an object to be photographed, including a condenser lens having at least one aspheric lens surface located on a side of said condenser lens nearer to the object. A diaphragm is provided behind the condenser lens, and, a split type light receiving device which has a plurality of divided light measuring areas is provided. The condenser lens gathers a bundle of rays reflected from the object, and the split type light receiving device is provided behind the diaphragm with respect to the object and receives light which passes through the diaphragm.

The present disclosure relates to subject matter contained in Japanese patent application No. 5-127152 (filed on May 28, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
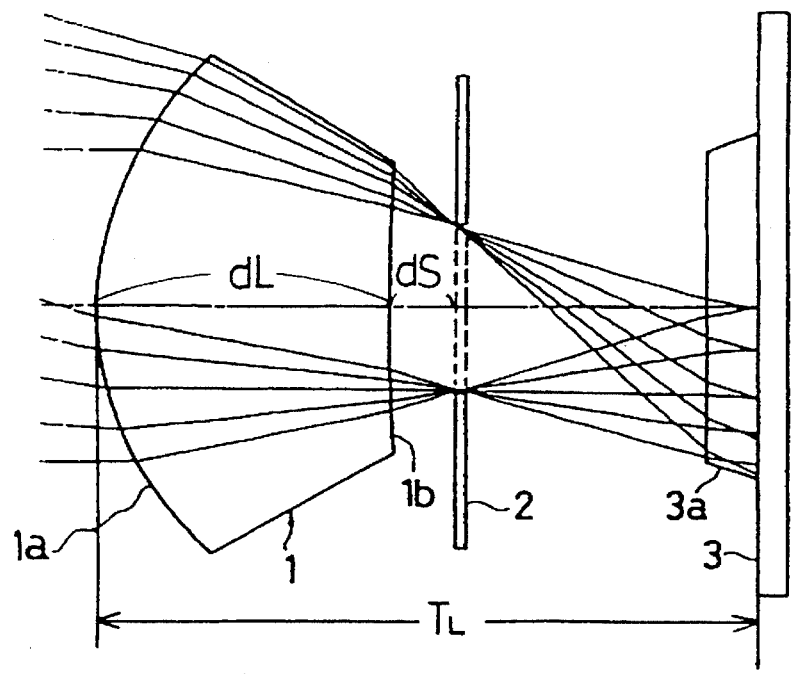
FIG. 1 is an explanatory view of an optical system of a photometering apparatus according to a first embodiment of the present invention.

In the illustrated embodiment, the photometer according to the present invention is comprised of a light gathering lens (i.e., condenser lens) 1, a diaphragm 2, and a light receiving device 3, arranged in this order from an object side, as can be seen in FIG. 1. The diaphragm 2 permits a bundle of rays to pass through different portions of the condenser lens 1, so that the bundle of rays can be converged onto the light receiving device 3 at respective image heights. The shape of the aspheric lens surface 1a is determined such that the field curvature (i.e., curvature of the image) is compensated at each image height, so that the spot diameter can be reduced as much as possible at any image height. Consequently, a correct spot measurement can be executed not only at the center portion of the picture plane but also the peripheral edge portion thereof.

The requirement or condition represented by the above-mentioned formula (1) ensures that the field curvature can be restricted over the whole image surface (i.e., from the center portion to the peripheral edge portion thereof).

If the value of $L_{ASP}/T_L$ in formula (1) is smaller than the lower limit (i.e., 0.3), the diaphragm 2 is located too far from the light receiving device 3 and too close to the condenser lens 1 to effectively eliminate the field curvature. Conversely, if the value of $L_{ASP}/T_L$ in formula (1) is larger than the upper limit (i.e., 0.7), the diaphragm 2 is located too far from the condenser lens 1 and too close to the light receiving device 3 to receive a sufficient amount of light. Consequently, the diameter of the condenser lens must be increased to receive the necessary amount of light, resulting in a difficulty in obtaining a sufficient thickness of the edge of the lens, in view of the shape of the aspheric lens surface.

In theory, the aspheric lens surface lens, i.e., the surface nearer to the object to be photographed or the surface on the image side. Preferably, the aspheric lens surface is provided on the surface nearer the object to be photographed since the aberration correcting effect can be enhanced as the distance of the diaphragm from the aspheric surface increases.

FIG. 1 shows a first embodiment of the photometering apparatus according to the present invention.

The photometering apparatus shown in FIG. 1 includes a condenser lens (i.e., light gathering lens) 1 in the form of a positive meniscus lens which is convex in the direction of (or facing towards) the object and which has an aspheric surface $1a = 1$ and a surface $1b$; A diaphragm 2 which is located at a predetermined distance behind the condenser lens 1, and a light receiving device 3 is provided behind the diaphragm 2. The light receiving device 3 has a planar glass cover $3a$ provided on the front surface thereof.

In the first embodiment illustrated in FIG. 1, the value of $L_{ASP}/T_L$ in the condition represented by formula (1) is 0.4 (i.e. $L_{ASP}/T_L = 0.4$);

wherein $d_L = 2.92$; $d_s = 0.68$; $N = 1.494$; $L_{ASP} = 2.63$; $T_L = 6.59$.

Note that the light receiving area of the light receiving device 3 is divided into a plurality of detecting areas for the purpose of a split measurement.

As is well known, a photometering circuit (not shown) receives luminance data outputted from respective detecting areas of the light receiving device 3. The photometering circuit determines the photographing conditions or requirements, using the luminance data, of a desired detecting area or desired detecting areas.

The photometering apparatus shown in FIG. 1, according to the first embodiment, is particularly useful in a lens shutter type camera in which a photographing optical system and a photometering optical system are independently provided. In a lens shutter type camera, light reflected from the object is directly converged by the condenser lens 1 onto the light receiving device 3 to detect the luminance (i.e., brightness). In the application of the first embodiment of the photometering apparatus to the lens shutter type camera, the optical system of the photometering apparatus constitutes an infinite image forming optical system of the lens shutter type camera.

Figure 2:
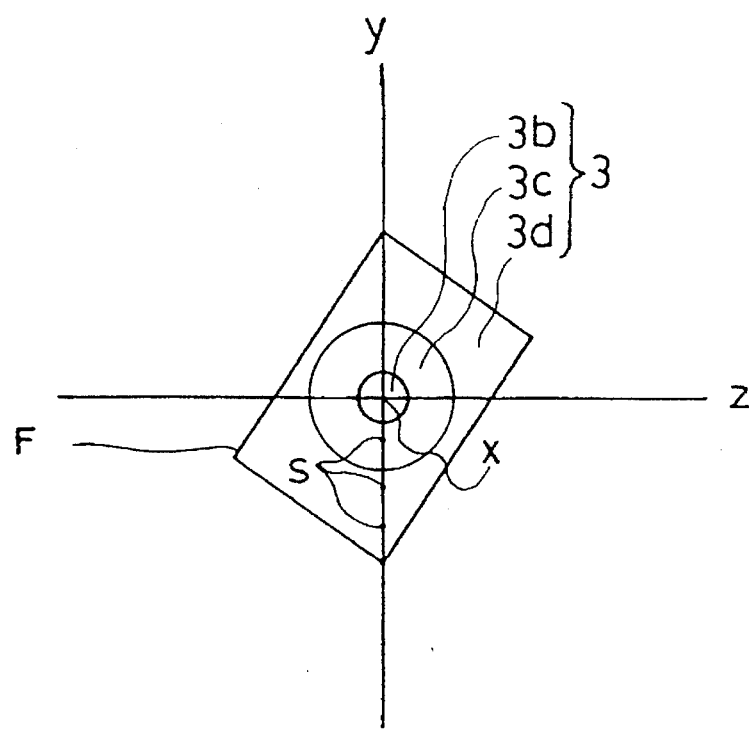
FIG. 2 is a spot diagram on a light receiving device of the photometering apparatus shown in FIG. 1.

FIG. 2 shows a spot diagram on the light receiving device 3 in the photometering apparatus of the first embodiment. The light receiving device 3 is provided with a circular center area $3b$, an annular intermediate area $3c$ surrounding the center area $3b$, and the remaining outer area (i.e., peripheral area) $3d$. In FIG. 2, the optical axis of the photometering apparatus is defined by an axis x normal to the plane of the drawing. The direction of the diagonal of the light receiving area (i.e., divided detecting areas) of the light receiving device 3 corresponding to a 35 mm size picture image area is identical to the ordinate y of the orthogonal coordinate y-z normal to the axis x. In FIG. 2, "F" represents the light receiving area, and "s" the spots (i.e., point images) at different image heights formed by a combination of the condenser lens 1 and the diaphragm 2. As can be seen in FIG. 2, spot images having extremely small diameters are obtained regardless of the image height.

Figure 3:
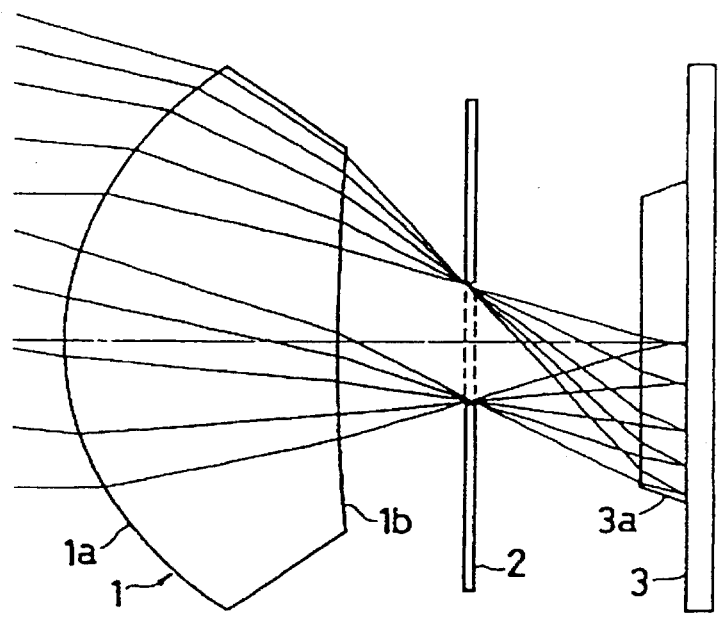
FIG. 3 is an explanatory view of an optical system of a photometering apparatus according to a second embodiment of the present invention.

FIG. 3 shows a second embodiment of the photometering apparatus according to the present invention. Similar to the first embodiment shown in FIG. 1, the photometering apparatus shown in FIG. 3 constitutes the infinite image forming optical system and includes the positive meniscus condenser lens (i.e., light gathering lens) 1, the diaphragm 2, and the light receiving device 3. In the second embodiment illustrated in FIG. 3, the value of $L_{ASP}/T_L$ in the condition represented by formula (1) is 0.5 ($L_{ASP}/T_L = 0.5$);

wherein $d_L = 2.86$; $d_s = 1.37$; $N = 1.494$; $L_{ASP} = 3.28$; $T_L = 6.58$.

Figure 4:
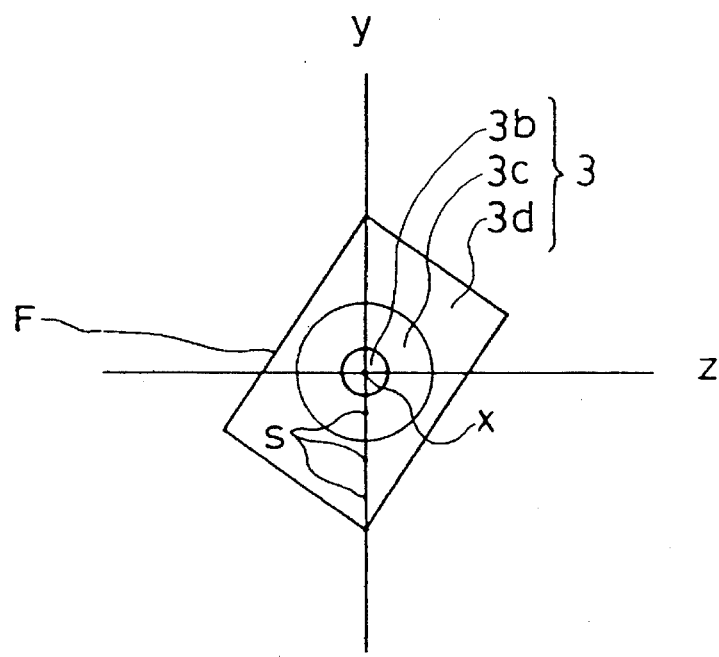
FIG. 4 is a spot diagram on a light receiving device of the photometering apparatus shown in FIG. 3.

FIG. 4 shows a spot diagram on the light receiving device 3 in the photometering apparatus of the second embodiment. Symbols and reference numerals shown in FIG. 4 are identical to those in FIG. 2 corresponding to the first embodiment. Accordingly, no detailed explanation therefor will be given herein.

Figure 5:
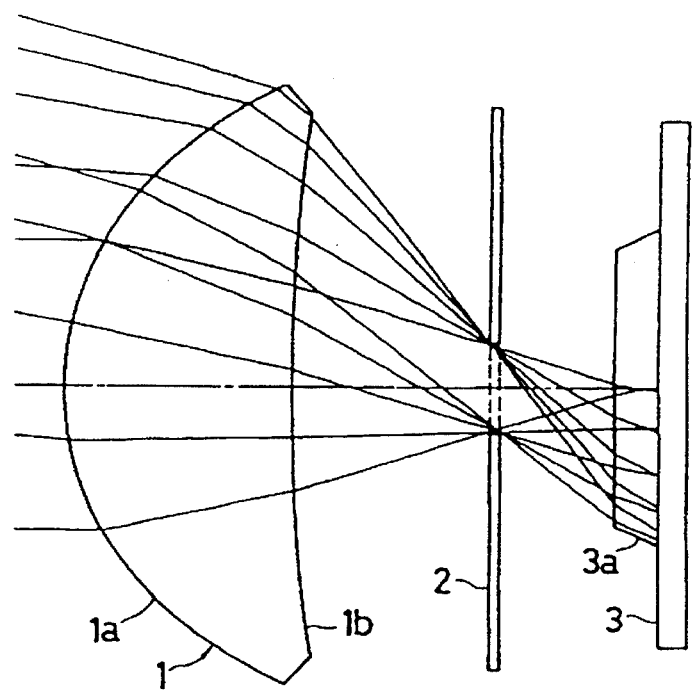
FIG. 5 is an explanatory view of an optical system of a photometering apparatus according to a third embodiment of the present invention.

FIG. 5 shows a third embodiment of the photometering apparatus according to the present invention. Similar to the first embodiment shown in FIG. 1, the photometering apparatus shown in FIG. 5 includes an infinite image forming optical system including the positive meniscus condenser lens (i.e., light gathering lens) 1, the diaphragm 2, and the light receiving device 3. In the third embodiment illustrated in FIG. 5, the value of $L_{ASP}/T_L$ in the condition represented by formula (1) is 0.6 ($L_{ASP}/T_L = 0.6$);

wherein $d_L = 2.52$; $d_s = 2.15$; $N = 1.494$; $L_{ASP} = 3.84$; $T_L = 6.52$.

Figure 6:
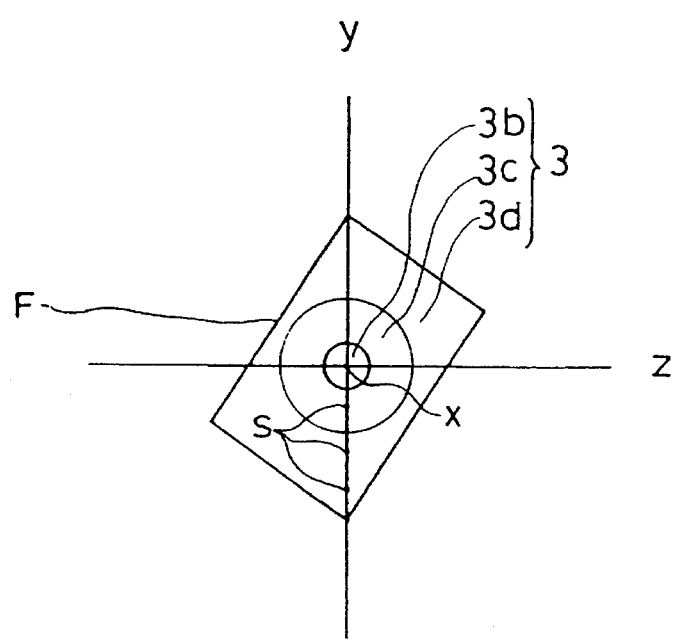
FIG. 6 is a spot diagram on a light receiving device of the photometering apparatus shown in FIG. 5.

FIG. 6 shows a spot diagram on the light receiving device 3 in the photometering apparatus of the third embodiment. Symbols and reference numerals shown in FIG. 6 are identical to those in FIG. 2 corresponding to the first embodiment. Accordingly, no detailed explanation therefor will be given herein.

Figure 7:
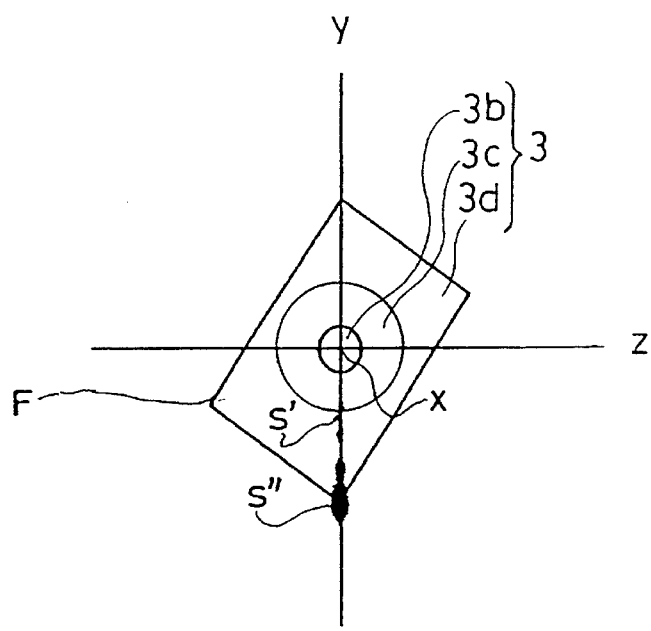
FIG. 7 is a spot diagram on a light receiving device in an infinite object image forming system of a conventional photometering apparatus in which there is no diaphragm between a condenser lens and the light receiving device.

FIG. 7 shows a spot diagram on a light receiving device in a known infinite image forming optical system in which a diaphragm is not provided between the condenser lens and the light receiving device, for the sake of comparison. As can be seen in FIG. 7, a point image cannot be formed due to the coma in the conventional photometering apparatus. In particular, the adverse influence of the comatic aberration on the formation of the point image becomes serious as the image height on the ordinate y increases.

It may be easily understood from FIGS. 2, 4 and 6 in comparison with FIG. 7 that the presence of the diaphragm 2 significantly contributes to a formation of a beam spot having an extremely small diameter on the light receiving device 3. The accuracy of measurement of the luminance deteriorates due to the enlargement of the beam spot on the light receiving device. The adverse influence of the enlargement of the beam spot on the accuracy of measurement becomes serious as the number of divisions of the light receiving area of the light receiving device 3 increases. The split measurement is carried out, for example, to detect the back light to thereby correct the exposure. As the beam spot enlarges, it will spread over the adjacent detecting areas of the light receiving area. Accordingly, if a beam spot having a large diameter is formed, an increase in the number of divisions of the detecting areas has an adverse influence on the accuracy of measurement.

Figure 8:
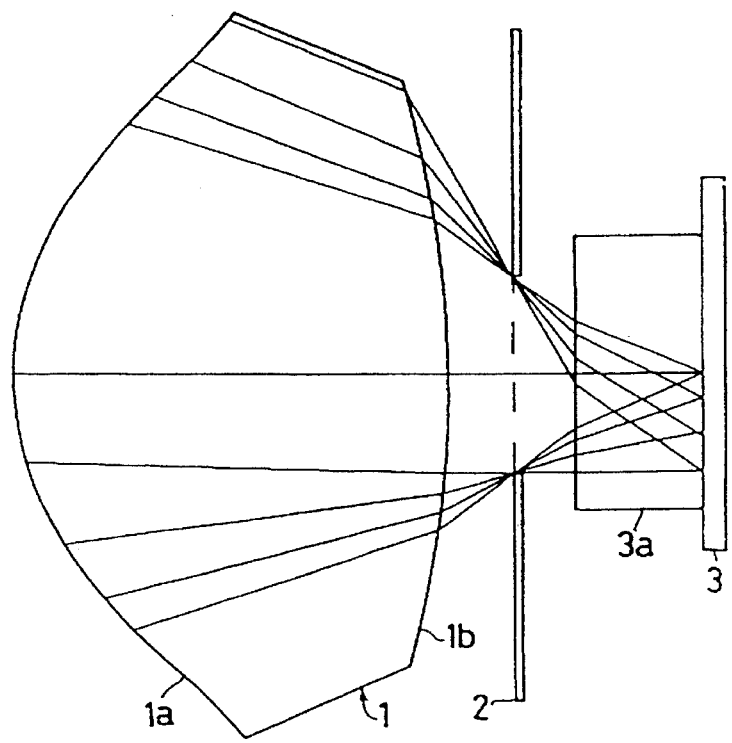
FIG. 8 is an explanatory view of an optical system of a photometering apparatus according to a fourth embodiment of the present invention.

FIG. 8 shows a fourth embodiment of the photometering apparatus according to the present invention. The optical system of the photometering apparatus shown in FIG. 8 includes a condenser lens (i.e., light gathering lens) 1 made of a double-convex lens having an aspheric surface 1a and a surface 1b, a diaphragm 2 which is located at a predetermined distance behind the condenser lens 1, and a light receiving device 3 provided behind the diaphragm 2 and having a planar glass cover 3a provided on the front surface thereof.

In the fourth embodiment illustrated in FIG. 8, the value of $L_{ASP}/T_L$ in the condition represented by formula (1) is 0.5 ($L_{ASP}/T_L=0.5$);

wherein $d_L=5.34$; $d_s=0.81$; $N=1.590$; $L_{ASP}=4.16$; $T_L=8.50$.

The photometering apparatus of the fourth embodiment is particularly advantageous when applied to a single lens reflex camera. In a single lens reflex camera, the bundle of rays reflected from the object and transmitted through a photographing lens is converged onto a screen of a finder optical system through a quick return mirror provided in front of a film surface. The image formed on the screen is viewed by a photographer through the finder optical system. The photometering apparatus re-converges the image formed on the screen onto the light receiving device 3 to thereby detect the luminance of the object. In this case, the optical system of the photometering apparatus constitutes a finite image forming optical system in which the screen corresponds to the object.

Figure 9:
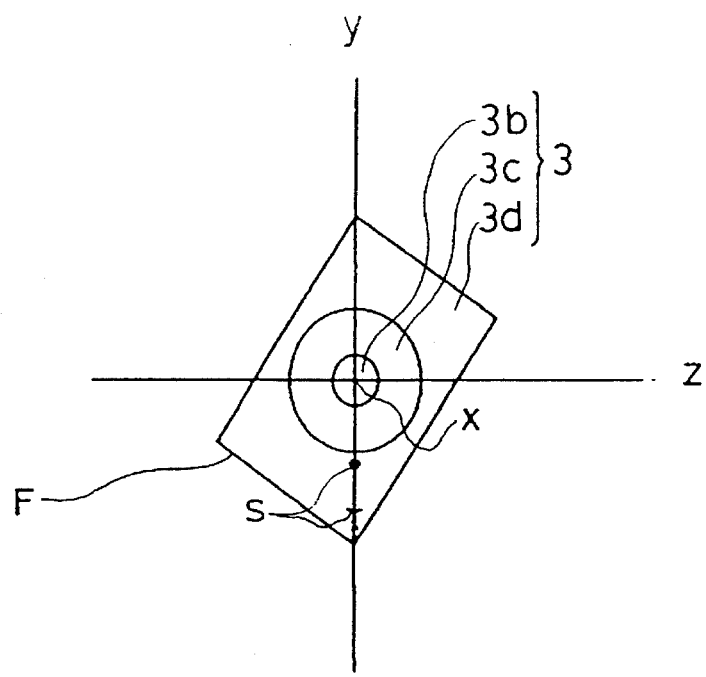
FIG. 9 is a spot diagram on a light receiving device of the photometering apparatus shown in FIG. 8; and, FIG. 10 is a spot diagram on a light receiving device in a finite object image forming system of a conventional photometering apparatus in which there is no diaphragm between a condenser lens and the light receiving device.

FIG. 9 shows a spot diagram on the light receiving device 3 in the photometering apparatus of the fourth embodiment. Symbols and reference numerals shown in FIG. 9 are identical to those in FIG. 2. Accordingly, no detailed explanation therefor will be given herein.

Figure 10:
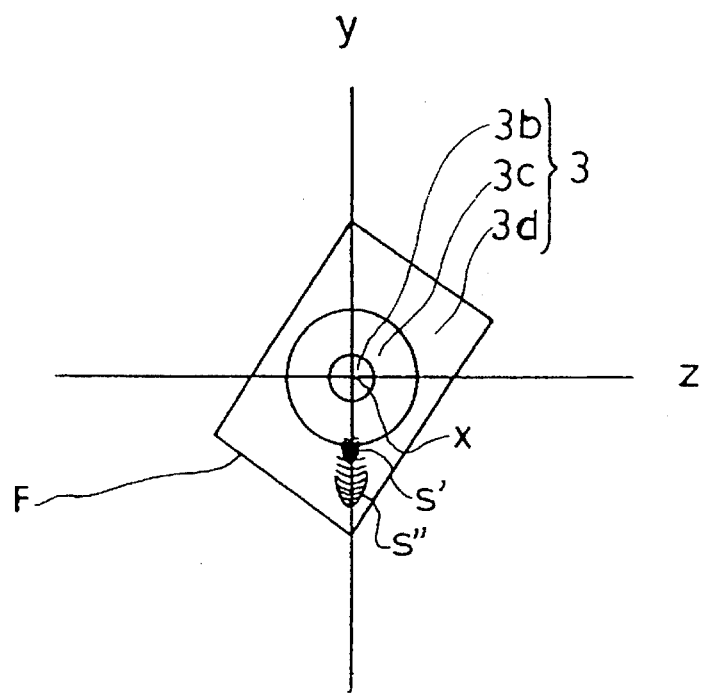

FIG. 10 shows a spot diagram on a light receiving device in a known finite image forming optical system in which a diaphragm is not provided between the condenser lens and the light receiving device, for the sake of comparison. As can be seen in FIG. 10, a point image cannot be formed due to the coma in the conventional photometering apparatus, as indicated by s' and s".

It can be easily understood from FIGS. 9 and 10 that the diaphragm 2 significantly contributes to a formation of an extremely small diameter of beam spot on the light receiving device 3.

As can be seen from the above discussion, according to the present invention, since the diaphragm is provided at a predetermined distance behind the condenser lens, the beams which are to be converged onto the light receiving device at different image heights can be transmitted through different portions of the condenser lens. Consequently, it is possible to provide an aspheric surface on the condenser lens to correct the field curvature at each image height to thereby form spot beams having a small diameter not only at the center portion of the image plane, but also at the peripheral portion thereof. Consequently, a precise split measurement of the brightness of an object to be photographed can be effected.

We claim:

1. A photometering apparatus for measuring the brightness of an object to be photographed, comprising:

a condenser lens having at least one aspheric lens surface, said condenser lens gathering a bundle of rays reflected from the object; 'a diaphragm provided at a predetermined distance behind said condenser lens with respect to the object; and, a split type light receiving device having a plurality of divided light measuring areas, said split type light receiving device provided behind said diaphragm with respect to the object and receiving light which passes through said diaphragm;

wherein the following formula is satisfied:

$$0.3 \leq L_{ASP}/T_L \leq 0.7$$

wherein "$T_L$" represents distance between a surface of said condenser lens nearer to the object to be photographed and said split type light receiving device, and wherein "$L_{ASP}$" represents reduced distance between said aspheric surface of said condenser lens and said diaphragm, represented by $L_{ASP}=(d_L/N)+d_s$, wherein "$d_L$" represents thickness of said condenser lens, "$d_s$" distance between said diaphragm and a surface of said condenser lens nearer to an image of the object, and "N" refractive index of said condenser lens at e-line.

2. The photometering apparatus of claim 1, said aspherical surface provided at a surface of said condenser lens nearer to the object.

3. The photometering apparatus of claim 1, said split type light receiving device having a circular center light receiving area and a remaining light receiving area external to said center light receiving area.

4. The photometering apparatus of claim 3, said split type light receiving device having an annular intermediate area between said circular center area and said remaining light receiving area.

5. A photometering apparatus for measuring the brightness of an object to be photographed, comprising:

a condenser lens having at least one aspheric lens surface located on a side of said condenser lens nearer to the object, said condenser lens gathering a bundle of rays reflected from the object;

a diaphragm provided behind said condenser lens; and a split type light receiving device having a plurality of divided light measuring areas, said split type light receiving device provided behind said diaphragm with respect to the object and receiving light which passes through said diaphragm;

said at least one aspheric lens surface being shaped for reducing a spot diameter formed on said split type light receiving device at any image height; and said shape of said aspheric lens surface comprising means for restricting field curvature.

6. The photometering apparatus according to claim 5, said split type light receiving device comprising a circular center light receiving area and a remaining light receiving area external to said center light receiving area.

7. The photometering apparatus according to claim 5, positional relationships between said aspheric surface of said condenser lens, said diaphragm and said light receiving device comprising means for restricting field curvature of an image of an object to be photographed.

8. The photometering apparatus according to claim 5, said aspheric lens surface comprising means for compensating for field curvature.

9. The photometering apparatus according to claim 5, said photometering apparatus comprising an infinite image forming optical system.

10. The photometering apparatus according to claim 5, said spot diameter being formed at said any image height by said condenser lens and said diaphragm.

11. The photometering apparatus according to claim 5, said condenser lens comprising a positive meniscus condenser lens.

12. The photometering apparatus according to claim 5, said condenser lens comprising a double-convex lens.

* * * * *